Dec. 3, 1940. J. D. ROVICK ET AL 2,223,920
BROACHING MACHINE
Filed Dec. 31, 1937 3 Sheets-Sheet 1
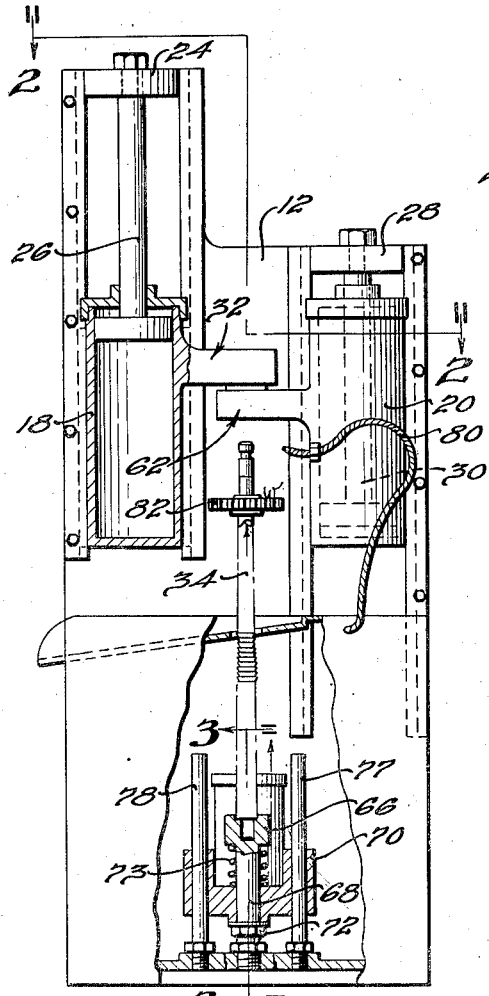
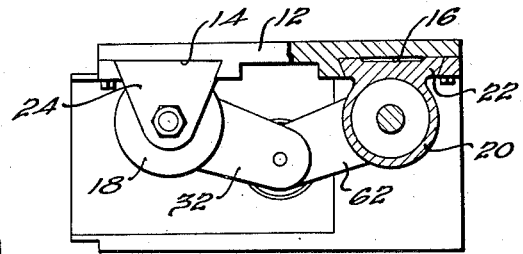
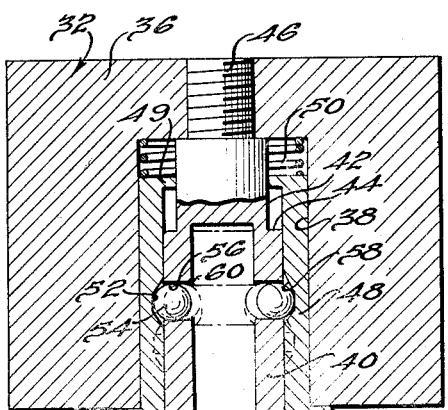
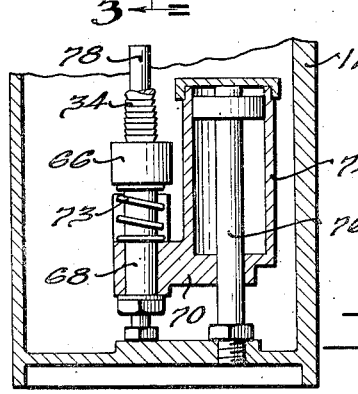
INVENTORS.
John D. Rovick,
William A. Hart.
BY Harness, Dickey, Pierce & Hann
ATTORNEYS.

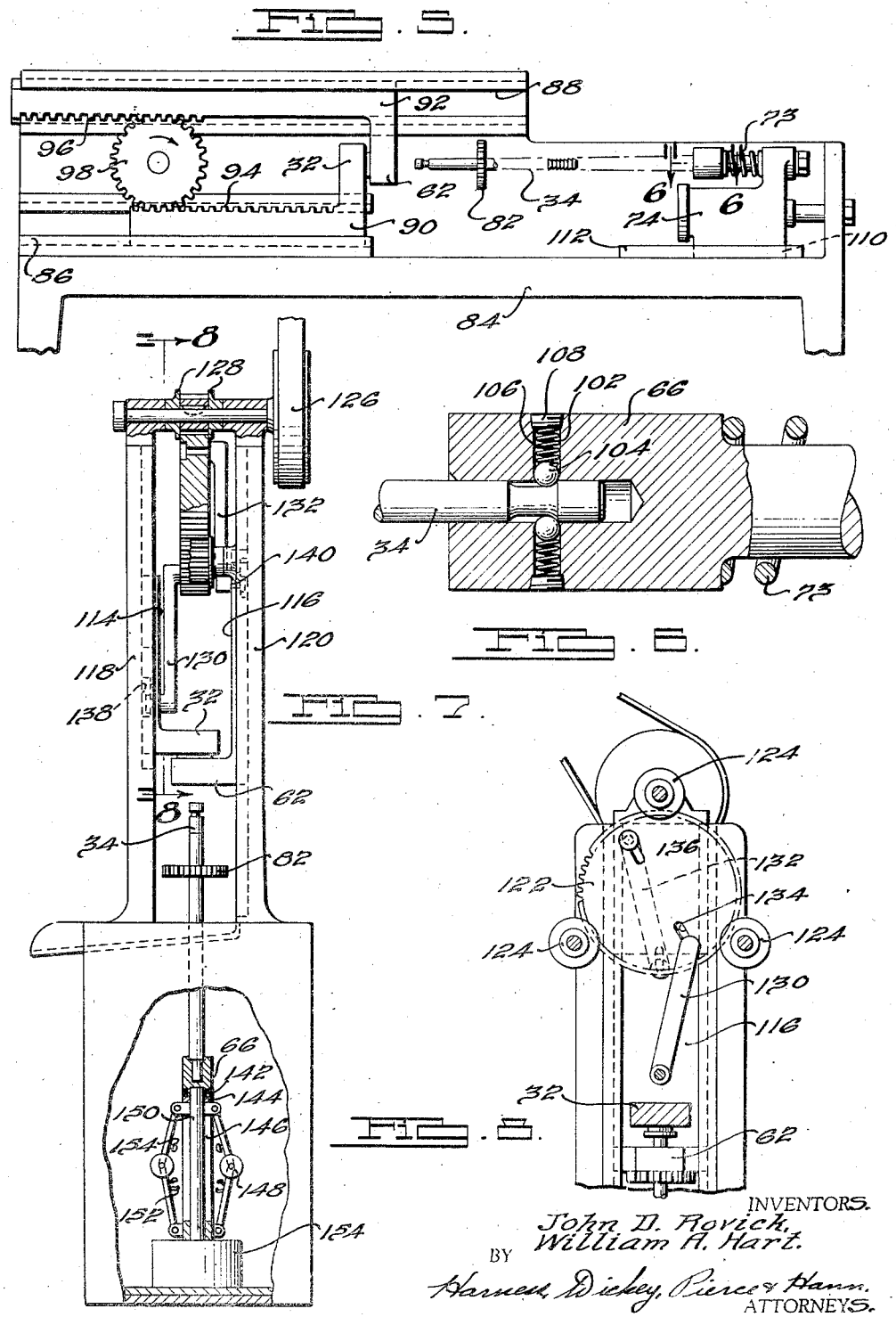

Dec. 3, 1940.   J. D. ROVICK ET AL   2,223,920
BROACHING MACHINE
Filed Dec. 31, 1937   3 Sheets-Sheet 3

INVENTORS
John D. Rovick,
William A. Hart.
BY Harness, Dickey, Pierce & Hann.
ATTORNEYS Patented Dec. 3, 1940

2,223,920

UNITED STATES PATENT OFFICE 2,223,920

BROACHING MACHINE

John D. Rovick and William A. Hart, Detroit, Mich., assignors to Colonial Broach Company, Detroit, Mich., a corporation of Michigan Application December 31, 1937, Serial No. 182,833

15 Claims. (Cl. 90—33)

This invention relates to machine tools and particularly relates to broaching machines.

One of the principal objects of the present invention is to decrease the size of broaching machines by providing broaching apparatus in which the broach and the stock are both moved in opposite directions to each other during the working stroke.

Another object of the present invention is to provide simplified broaching apparatus of more compact constructions than previously known.

A more specific object of the present invention is to provide a structure in which a broach is engaged for movement in one direction and the stock is engaged for movement in the opposite direction, the cutting taking place while both the broach and stock are being moved in opposite directions.

A further specific object of the present invention is to provide mechanical means for moving the broach in one direction and for moving the stock in the opposite direction during the working strokes, thereby providing a simplified and more economical construction, in that expensive hydraulic apparatus and attachments are dispensed with and the machine may be operated more economically.

Another object of the present invention is to provide novel apparatus for supporting and moving the broach into engagement with the broach head and for returning the broach to a position in which the stock may be mounted thereon for cutting.

Other objects of the invention will become apparent from the following specification, the drawings relating thereto, and from the claims hereinafter set forth.

In the drawings in which like numerals are used to designate like parts in the several views throughout:

Figure 1 is a front elevational view, with parts broken away, showing parts in section, of a broaching machine embodying features of the present invention;

Fig. 2 is a top view taken substantially along the line 2—2 of Fig. 1;

Fig. 3 is a cross-sectional view taken substantially along the line 3—3 of Fig. 1;

Fig. 4 is an enlarged vertical cross-sectional view showing certain detailed features of the present invention;

Fig. 5 is a front elevational view of a modified form of broaching machine embodying features of the present invention;

Fig. 6 is a cross-sectional view taken substantially along the line 6—6 of Fig. 5;

Fig. 7 is an elevational view, with parts broken away, showing parts in section, of a modified form of broaching machine embodying the features of the present invention;

Fig. 8 is a cross-sectional and elevational view taken substantially along the line 8—8 of Fig. 7;

Figure 9:
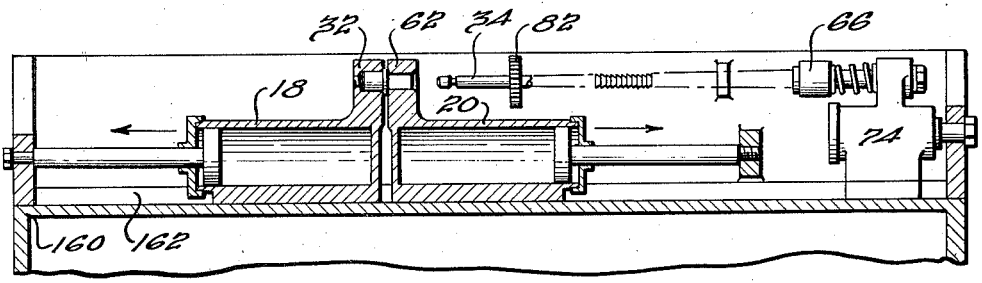
Fig. 9 is an elevational view showing parts in cross-section of a further modified form of broaching machine.

Referring in detail to the drawings, and particularly referring to Figs. 1 to 4, a broaching machine is illustrated comprising a substantially vertical upstanding supporting frame 12 having substantially vertical and parallel guideways 14 and 16. Within each of the guideways 14 and 16 are mounted reciprocating cylinders 18 and 20, respectively, the cylinders having formed therewith integral portions 22 complementary in shape to the cross-sectional shape of the guideways for slidably mounting the cylinders relative to the frame. An outwardly extending arm 24 is fixedly secured to the frame member 12 adjacent the path of the guideway 14 for fixedly securing a piston 26 relative to the frame. A similar arm 28 is provided above the cylinder 20 and has fixedly secured thereto a piston 30 associated with the movable cylinder 20.

The cylinder 18 has formed integral therewith, or secured thereto, a broach head 32 projecting outwardly therefrom. The broach head 32 is adapted to releasably engage a broach 34 and comprises a block member 36 having a substantially central cored out cylindrical portion 38. An inner sleeve member 40 is provided with a reduced portion 42 forming shoulders 44 and is mounted within the cored out portion 38 of the block member 36. The sleeve member 40 is further provided with a threaded extension 46 which is threaded into and secured in position with respect to the block member 36 to locate the sleeve member substantially centrally of the portion 38. The inner sleeve 40 is cored out throughout its main or shank portion to receive the head of the broach 34.

An outer sleeve 48 is slidably received over the sleeve 40, and at its upper end is provided with an inwardly extending rim 49 for cooperation with the annular shoulder 44, to thereby limit the relative movement between the two sleeves. A spring 50 is seated between the sleeve 48 and the inner surface of the block member 36 and tends to move the sleeve 48 downwardly to a position in which the rim 49 and shoulder 44 are in engagement.

Sleeve 48 is also provided with recesses 52 for the reception of balls 54 located within openings 56 in sleeve 40. The edges 58 of the recesses 52 are sloped to provide camming surfaces for a purpose to be later described. The openings 56 are slightly greater in diameter than the balls 54, so that the balls may freely move therein, and are provided with inwardly directed annular portions 60 to limit the radial inward movement of the balls.

The cylinder 20 is provided with an outwardly extending member 62 extending at its outer end to a position below and in line with the broach head 32. The member 62 is provided with an opening 64 therethrough, through which the broach 34 is adapted to travel during the operation of the broaching machine.

Means are provided for supporting the broach 34 in a work loading position and for moving the broach upwardly into engagement with the broach head 32. Referring to Figs. 1 and 3, these means comprise a socket member 66 adapted to releasably receive therein the lower end of the broach 34. The socket member 66 is provided with a downwardly extending shank portion 68 which is slidably received within an opening through a cross-head 70. Suitable means, such as a nut 72, is threaded on to the lower end of the shank 68 abutting the lower surface of the cross-head to limit the upward movement of the socket 66 relative to the cross-head. A cushioning spring 73 is interposed between the under surface of the socket and the upper surface of the cross-head to resiliently urge the socket member 66 upwardly.

The cross-head 70 is formed integral with or attached to a reciprocating cylinder 74, the cylinder 74 being reciprocated relative to a fixed plunger 76 which is suitably secured to the base of the frame 12.

In order to guide the socket 66 as it reciprocates with the cylinder 74 and maintain its movement in a substantially straight line, openings are provided through the cross-head at opposite sides thereof which slidably receive guide members 77 and 78, the guide members being suitably secured to the base of the framework.

In order to provide a cooling fluid to the broach just before its cutting portions engage the stock, suitable means, such as a flexible tubular member 80, is suitably secured to the cylinder 20 for movement therewith. It is to be understood that the tubular member 80 is connected to a suitable source of cooling fluid in a conventional manner.

It is to be understood that the machine above described is automatic in its operation, the cylinders 18, 20 and 74 being automatically operated in a manner similar to that described and claimed in the patent of Wm. A. Hart, No. 2,162,813, issued June 20, 1939, and assigned to the assignee of the present invention.

The operation of the apparatus shown in Figures 1 to 4 is as follows:

The parts forming the broaching apparatus are shown in Figures 1, 3 and 4 in positions at the start of the broaching operation and it can be seen that at the start of the broaching operation, the broach 34 is supported within the socket 66 and the cylinder 74 is in its lowermost position. A space is thus provided between the top of the broach and the member 62, and the stock 82 to be worked upon is placed over the broach in a position as indicated in Fig. 1. After the stock has been loaded, the cylinder 74 is operated to raise the socket 66 and force the upper end of the broach into the broach head, as shown in broken lines in Fig. 4.

The cylinders 18 and 20 are then operated to move in opposite directions, and for the first part of this movement, the spring 73 will tend to urge the broach 34 upwardly following the upward movement of the broach head 32.

Referring particularly to Figure 4, at the starting position the member 62 abuts against the sleeve 48 and urges it upwardly within the broach head against the action of the spring 50, and while in such position, the balls 54 are received within the recesses 52, thereby permitting passage of the upper end of the broach into the cavity in sleeve 40.

As the broach head 32 and member 62 recede from each other, sleeve 48 is urged downwardly by the spring 50, causing the balls 54 to be urged radially inwardly by the camming action of the slanting sides 58, thus forcing the balls into engagement with the upper end of the broach and holding it securely relative to the broach head 32.

Continued movement of the cylinder 20 in a downward direction causes the member 62 to abut against the stock 82 and move the stock downwardly with the member 62. At the same time, the broach head 32 is moved upwardly and carries the broach 34 with it.

The broach has been, at this stage, released from its support by the sprocket 66 and is carried upwardly through the stock 82. It is evident from the above description that by moving the broach in one direction and at the same time moving the stock being worked upon in the opposite direction that the distance that the broach must travel during the cutting operation is materially reduced and that therefore the broaching apparatus may be materially reduced in size.

When the broach has been moved entirely through the stock 82, the stock 82 drops on to a tray from which it may conveniently be removed.

After the completion of the working stroke of the cylinders 18 and 20, the directions of their movements are reversed so that the cylinder 18 moves downwardly and the cylinder 20 moves upwardly, returning these two cylinders to their starting positions as shown in Figs. 1 and 4. As the broach head 32 and member 62 approach and are returned to their starting positions, the member 62 abuts against the sleeve 48, moving it upwardly so that the recesses 52 are in line with the balls 54 which may be moved outwardly to a position within the recesses, thereby permitting removal of the broach 34 from the broach head. Upon the downward movement of the broach with the broach head, the lower end of the broach is again received within the socket 66, which has been maintained in its uppermost position, and after this reception of the lower end of the broach, the socket 66 is returned to its lowermost position for a repetition of the above described operation.

A modified structure is shown in Figures 5 and 6, in which the operation is similar in most respects to the operation of the structure described above, except that the operating parts are so arranged that the broach is moved in a horizontal direction. In this structure, a substantially horizontal frame member 84 is provided having spaced, substantially parallel, horizontal guideways 86 and 88. The broach head 32 and member 62 are formed integral with or attached to elongated members 90 and 92, respectively, slidable received within the gudeways 86 and 88, respectively. The elongated members 90 and 92 are provided with toothed rack portions 94 and 96 which face each other and are adapted to engage a pinion 98. The pinion 98 is suitably secured to the frame 84 and suitable means are provided for rotating the pinion in either direction.

The socket for supporting the broach 34 is somewhat different from the socket 66 in that radially extending openings 102 are provided in the socket 66 which are adapted to receive ball members 104. Springs 106 are also received within the openings 102 and are held in place therein by suitable threaded members 108. The spring members 106 urge the balls into frictional engagement with the end of the broach 34 with sufficient force to support the broach 34 in the socket 66 until it is withdrawn therefrom by the broach head. The inner ends of the openings 102 are curved inwardly to limit the radial inward movement of the balls 104.

In the modified structure shown in Fig. 5, the reciprocating cylinder 74 is provided with guide portions 110 which are slidably received within a guideway 112, the structure of such guideway and guide portions being similar to the channel 16 and guide portion 22 indicated in Fig. 2.

The operation of the structure shown in Figs. 5 and 6 is similar to that described above in regard to Figs. 1 to 4, and viewing Fig. 5, it can be seen that upon rotation of the pinion 98 in a clockwise direction that the broach head 32 is moved towards the left and the member 62 is moved towards the right during the working stroke to cause the broaching operation described above. Upon reversing the direction of rotation of the pinion 98, the broach head 32 and the member 62 are returned to the starting position as indicated in Fig. 5.

Referring to the structure shown in Figs. 7 and 8, a simplified and economical mechanically operated broaching apparatus is shown. In the mechanism shown in Figs. 7 and 8 the reciprocating cylinders shown in Figs. 1 to 4 are dispensed with and the broach head 32 and the member 62 are provided with elongated guide portions 114 and 116 respectively, either formed integral therewith or attached thereto. The guide portions 114 and 116 are similar in cross section to the guide portion 22 shown in Fig. 2 and are slidably received within facing guideways, similar in cross section to the guideways 14 and 16 shown in Fig. 2, on upstanding frame members 118 and 120, respectively.

The broach head 32 and member 62 with their respective guiding portions are adapted to reciprocate in opposite directions and the means for effecting this reciprocation comprises a solid gear 122 mounted upon and rotated by pinions 124. In the structure illustrated, three pinions 124 equally spaced from each other around the periphery of the gear are provided, the uppermost pinion being suitably connected to a pulley 126 for driving the gear. Each of the pinions 124 is provided with outwardly directed annular flanges 128 at each side thereof which are adapted to embrace the outer surfaces of the gear 122 adjacent the outer periphery to prevent axial displacement of the gear. It is to be understood that although the top pinion is shown as the driving pinion, any, or all, of the pinions may drive the gear within the scope of the invention.

Crank arms 130 and 132 connect the portions 114 and 116, respectively, of the broach head and engaging member with the gear 122. The upper ends of the crank arms 130 and 132 are adjustably connected to the gear 122 through diametrically opposed slots 134 and 136 respectively. The lower ends of the arms 130 and 132 are adjustably connected to portions 114 and 116 within slots 138 and 140 of the members 114 and 116, respectively.

The operation of the above described mechanism is such that upon one complete revolution of the gear 122, the broach head 32 and member 62 are moved away from each other in opposite directions and are then moved towards each other for one complete cycle of the broaching operation. By adjusting the positions of the crank arms 130 and 132 in the slots 134 and 138, and 136 and 140, respectively, it can be seen that the lengths of stroke of the broach head and member 62 may be varied.

In the structure shown in Figs. 7 and 8 a simplified structure is also provided for supporting the broach 34 in its loading position and for raising the broach into engagement with the broach head. In this structure the socket 66 is mounted through a thrust bearing 142 to a reciprocating and rotating sleeve 144. The sleeve 144 is provided with longitudinally extending slots 146 therethrough and has secured thereto adjacent the lower end thereof the lower end of a fly ball mechanism 148. The upper end of the fly ball mechanism 148 is suitably secured through the slots 146 to a rotatable stub shaft 150. The stub shaft 150 is suitably connected at the lower end thereof to a driving mechanism such as a motor 154.

Upon rotation of the shaft 150, the weighted members of the fly ball mechanism move outwardly, thereby raising the sleeve 144 upwardly along the stub shaft and raising the socket 66 with the broach therein into engagement with the broach head.

When the socket 66 reaches its uppermost position, means are provided in the form of springs 152 and knobs or buttons 154 mounted on the links of the fly ball mechanism for holding the socket 66 in its uppermost position until the broach is returned thereto after the broaching operation. The spring means are of such strength that they will hold the weight of the sleeve and socket in the uppermost position but upon re-insertion of the broach into the socket, the weight of the broach will cause the springs to release, thereby dropping the socket to its lowermost position.

From the descriptive relative to Figs. 7 and 8, it can be seen that a simplified mechanical structure is provided for effecting the broaching operating in the manner according to the present invention. By this simplified mechanical structure expensive hydraulic apparatus and attachments are dispensed with and the machine may be operated more economically.

In the modified structure shown in Fig. 9, a substantially horizontal supporting frame 160 is provided having a single horizontal guideway 162 thereon. In this modification, the reciprocating cylinders 18 and 20 are mounted in the single guideway 162 in such a manner, as shown in Fig. 9, that the broach head 32 and member 62 are moved in opposite directions to effect the broaching operation described above. The supporting socket 66 is mounted in a similar manner as that shown and described in regard to Fig. 5.

Figure 10:
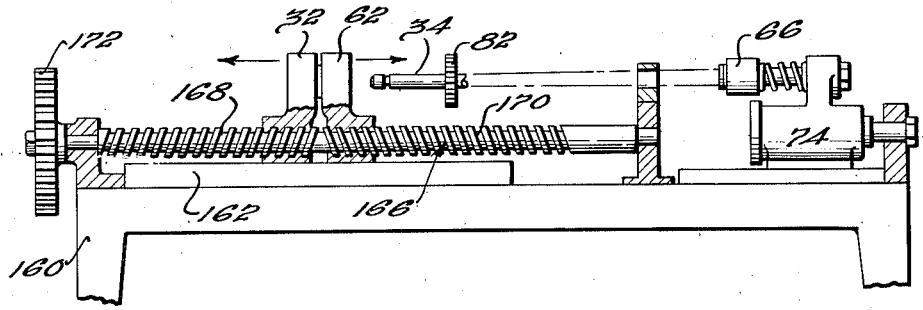
Fig. 10 is an elevational view showing parts in cross-section of another modified form of broaching machine embodying features of the present invention.

The modified structure shown in Fig. 10 is somewhat similar to that shown in Fig. 9, except that in Fig. 10 the reciprocating cylinders are replaced with a worm driving mechanism comprising a worm 166 engaging threaded portions on the broach head and member 62 respectively. The broach head 32 and member 62 are provided with guide portions which are adapted to be received within and guided by the guideway 162.

The worm 166 is threaded in opposite directions in portions 168 and 170 respectively, which engage the oppositely threaded portions on the broach head 32 and member 62 respectively. Suitable means such as a gear 172 connected to a suitable reversible prime mover is provided for rotating the worm 166 in opposite directions. Upon rotation of the worm in one direction, it can be seen that the broach head 32 and member 62 are caused to move away from each other to effect the operation described above; and upon rotation of the worm in the other direction, the broach head 32 and member 62 are caused to approach each other to return them to the starting position.

Formal changes may be made in the specific embodiments of the invention described without departing from the spirit and substance of the broad invention, the scope of which is commensurate with the appended claims.

What is claimed is:

1. A broaching machine comprising in combination a movable broach head operable to draw a broach in one linear direction from a starting position through a work stroke, and to return it to said starting position, and movable means operable to engage the stock being worked upon during the working stroke and move said stock in a linear direction opposite to that of the broach head during the working stroke whereby said broaching stroke is reduced in length.

2. A broaching machine comprising, in combination, a broach, a movable broach head including means adapted to engage said broach, said broach head being operable to draw said broach in one direction from a starting position through a working stroke and to return it to said starting position, and movable means having a portion in line with said broach head adapted to engage and move the stock being worked upon during the working stroke in a linear direction opposite to that of the broach head during the working stroke to reduce the length of the working stroke.

3. A broaching machine comprising, in combination, a broach, a reciprocating broach head including means adapted to releasably engage said broach, said broach head being operable to draw said broach in one direction from a starting position through a working stroke and return it to said starting position, and reciprocating means having a portion in line with said broach head adapted to engage and move the stock being worked upon during the working stroke in a direction opposite to that of the direction of movement of the broach head during the working stroke and return said movable means to its starting position, said reciprocating means engaging said releasable means when both are returned to their starting positions to thereby release said broach from engagement with said releasable means.

4. A broaching machine comprising, in combination, a broach, a supporting frame, said frame including a plurality of guideways substantially parallel to each other, reciprocating means mounted within each of said guideways, one of said reciprocating means including a broach head having means adapted to releasably engage said broach, another of said reciprocating means including a member in line with said broach head and adapted to engage the stock being worked upon during the working stroke, the construction and arrangement being such that said broach head and member are operable to move away from each other in a plane parallel to the plane of the broach during the working stroke of the broach and to move toward each other to return the broach head and member to their starting positions.

5. A broaching machine comprising, in combination, a broach, a supporting frame, said frame including a plurality of guideways substantially parallel to each other, reciprocating cylinders mounted within each of said guideways, one of said cylinders including a broach head having means adapted to releasably engage said broach, another of said cylinders including a member in line with said broach head and adapted to engage the stock being worked upon during the working stroke, the construction and arrangement being such that said broach head and said member are operable to move away from each other in a plane parallel to the plane of the broach during the working stroke of the broach and to move toward each other to return the broach head and member to their starting positions.

6. A broaching machine comprising, in combination, a broach, a vertical supporting frame, said frame including a plurality of substantially vertical guideways, reciprocating means mounted within each of said guideways, one of said reciprocating means including a broach head having means adapted to releasably engage said broach, another of said reciprocating means including a member in line with said broach head and adapted to engage the stock being worked upon during the working stroke, the construction and arrangement being such that said broach head and said member are operable to move away from each other in a plane parallel to the plane of the broach during the working stroke of the broach and to move toward each other to return the broach head and member to their starting position.

7. A broaching machine comprising, in combination, a broach, a supporting frame, said frame including a plurality of substantially parallel guideways, reciprocating means mounted within each of said guideways, each of said reciprocating means including a rack portion, one of said reciprocating means including a broach head having means adapted to releasably engage said broach, another of said reciprocating means including a member in line with said broach head and adapted to engage the stock being worked upon during the working stroke, and a pinion engaging the rack portions of said reciprocating means, the construction and arrangement being such that upon rotation of the pinion in one direction said broach head and said member are moved away from each other during the working stroke of the broach and are moved toward each other to return the broach head and member to their starting positions, upon rotation of the pinion in the opposite direction.

8. A broaching machine comprising, in combination, a broach, a supporting frame, said frame including a plurality of substantially parallel guideways, reciprocating means mounted within each of said guideways, one of said reciprocating means including a broach head having means adapted to releasably engage said broach, another of said reciprocating means including a member in line with said broach head and adapted to engage the stock being worked upon during the working stroke, a rotatable gear mounted on said support, and crank arms connecting said gear and said reciprocating means, the construction and arrangement being such that upon rotation of said gear, said broach head and said member are moved away from each other during the working stroke of the broach and are moved toward each other to return the broach head and member to their starting position.

9. A broaching machine comprising, in combination, a broach, a supporting frame, said frame including a plurality of substantially parallel guideways facing each other, reciprocating means mounted within each of said guideways, one of said reciprocating means including a broach head having means adapted to releasably engage said broach, another of said reciprocating means including a member in line with said broach head and adapted to engage the stock being worked upon during the working stroke, a rotatable gear mounted on said frame, and crank arms connected to said gear at substantially diametrically opposed points and connected to said reciprocating means respectively, the construction and arrangement being such that upon reciprocation of said gear, said broach head and said member are moved away from each other during the working stroke of the broach and are moved toward each other to return the broach head and member to their starting positions.

10. A broaching machine comprising, in combination, a broach, a supporting frame, said frame including a plurality of substantially parallel guideways facing each other, reciprocating means mounted within each of said guideways, one of said reciprocating means including a broach head having means adapted to releasably engage said broach, another of said reciprocating means including a member in line with said broach head adapted to engage the stock being worked upon during the working stroke, a rotatable gear mounted on said frame, and crank arms adjustably connected to said gear on opposite sides thereof at substantially diametrically opposed points and connected to said reciprocating means respectively, the connection between said crank arms and said gear and said reciprocating means being in the form of slots, the construction and arrangement being such that upon rotation of said gear said broach head and said member are moved away from each other during the working stroke of the broach and are moved toward each other to return the broach head and member to their starting position.

11. A broaching machine comprising, in combination, a broach, a supporting frame including a guideway, a plurality of reciprocating members mounted within said guideway, one of said members including a broach head having means adapted to releasably engage said broach, another of said members including a portion in line with said broach head and adapted to engage the stock being worked upon during the working stroke, the construction and arrangement being such that said reciprocating members are moved away from each other during the working stroke of the broach and are moved toward each other to return said members to their starting positions.

12. A broaching machine comprising, in combination, a broach, a supporting frame, said frame including a plurality of guideways substantially parallel to each other, reciprocating means mounted within each of said guideways, one of said reciprocating means including a broach head having means adapted to releasably engage said broach, another of said reciprocating means including a member in line with said broach head and adapted to engage the stock being worked upon during the working stroke, another reciprocating member mounted on said frame releasably supporting said broach and operable to move said broach into engagement with said broach head.

13. A broaching machine comprising, in combination, a broach, a supporting frame, said frame including a plurality of guideways substantially parallel to each other, reciprocating means mounted within said guideways, one of said reciprocating means including a broach head having means adapted to releasably engage said broach, another of said reciprocating means including a member in line with said broach head and adapted to engage the stock being worked upon during the working stroke, another reciprocating member mounted on said frame, said last named reciprocating member including a portion adapted to releasably support said broach and a fly ball mechanism connected thereto, the construction and arrangement being such that upon rotation of said fly ball mechanism said broach is moved into engagement with said broach head.

14. A broaching machine including, in combination, a broach, a supporting frame, reciprocating means for moving the broach through a cycle of operation, and a second reciprocating member including a portion adapted to releasably support said broach and a fly ball mechanism connected thereto, the construction and arrangement being such that upon rotation of said fly ball mechanism said broach is moved into engagement with said first reciprocating means.

15. A broaching machine including, in combination, a broach, a supporting frame, reciprocating means for moving the broach through a cycle of operation, a second reciprocating means for reciprocating the broach timed with the cycle of operation of said first reciprocating means, and a centrifugal mechanism employing fly balls for changing a movement in rotation to one of translation for operating one of said reciprocating means.

JOHN D. ROVICK.
WILLIAM A. HART.